US012690010B2

(12) United States Patent     (10) Patent No.:   US 12,690,010 B2

Tarlow et al.     (45) Date of Patent:     Jul. 21, 2026

(54) POSITION ESTIMATION BASED ON ENVIRONMENTAL, NON-UNIFORM PRIORS

(71) Applicant: QUALCOMM Incorporated, San Diego, CA (US)

(72) Inventors: Benjamin Tarlow, Cambridge (GB); Murray Jarvis, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 483 days.

(21) Appl. No.: 18/335,093

(22) Filed: Jun. 14, 2023

(65) Prior Publication Data

US 2024/0422728 A1     Dec. 19, 2024

(51) Int. Cl.
*H04W 64/00*     (2009.01)

(52) U.S. Cl.
CPC .................................. *H04W 64/006* (2013.01)

(58) Field of Classification Search
CPC ......... H04W 4/44; H04W 88/16; H04W 4/38; H04W 4/027; H04W 4/80; H04W 4/029; H04W 40/02; H04W 4/50; H04W 12/08; H04W 12/06; H04W 72/56; H04W 12/03; H04W 12/086; H04W 4/48; H04W 74/0866
See application file for complete search history.

(56) References Cited

U.S. PATENT DOCUMENTS

| | | |
|---|---|---|
| 8,570,214 B2 | 10/2013 | Shirai |
| 8,775,076 B2 | 7/2014 | Shirai |
| 9,128,187 B2 | 9/2015 | Kamaya et al. |
| 9,215,562 B1 * | 12/2015 | Banin .................... H04W 4/023 |
| 9,848,301 B2 * | 12/2017 | Mappus ................ H04W 4/025 |
| 2006/0217127 A1 | 9/2006 | Drane et al. |
| 2008/0036661 A1 | 2/2008 | Smith et al. |
| 2009/0082034 A1 | 3/2009 | Gray et al. |
| 2009/0112517 A1 * | 4/2009 | Hsyu ..................... G01S 5/0278 702/181 |
| 2009/0286549 A1 * | 11/2009 | Canon ................... G01S 5/0278 455/456.1 |
| 2015/0005000 A1 * | 1/2015 | Gyorfi ................. H04W 64/006 455/456.1 |
| 2016/0295373 A1 * | 10/2016 | Ronen ................... H04W 4/029 |
| 2017/0160378 A1 | 6/2017 | Amizur et al. |

OTHER PUBLICATIONS

International Search Report and Written Opinion—PCT/US2024/026006—ISA/EPO—Aug. 19, 2024.

* cited by examiner

*Primary Examiner* — Kwasi Karikari

(74) *Attorney, Agent, or Firm* — Muncy, Geissler, Olds & Lowe, P.C.

(57) ABSTRACT

Disclosed are techniques for positioning. In an aspect, a positioning entity obtains a set of error distributions associated with a set of locations associated with an environment, wherein each error distribution of the set of error distributions indicates an expected error distribution of positioning measurements associated with a corresponding location of the set of locations, obtains one or more positioning measurements obtained by a user equipment (UE) located within the environment; and determines a location estimate of the UE within the environment based on a comparison of uncertainty values associated with the one or more positioning measurements to the set of error distributions.

30 Claims, 13 Drawing Sheets

700

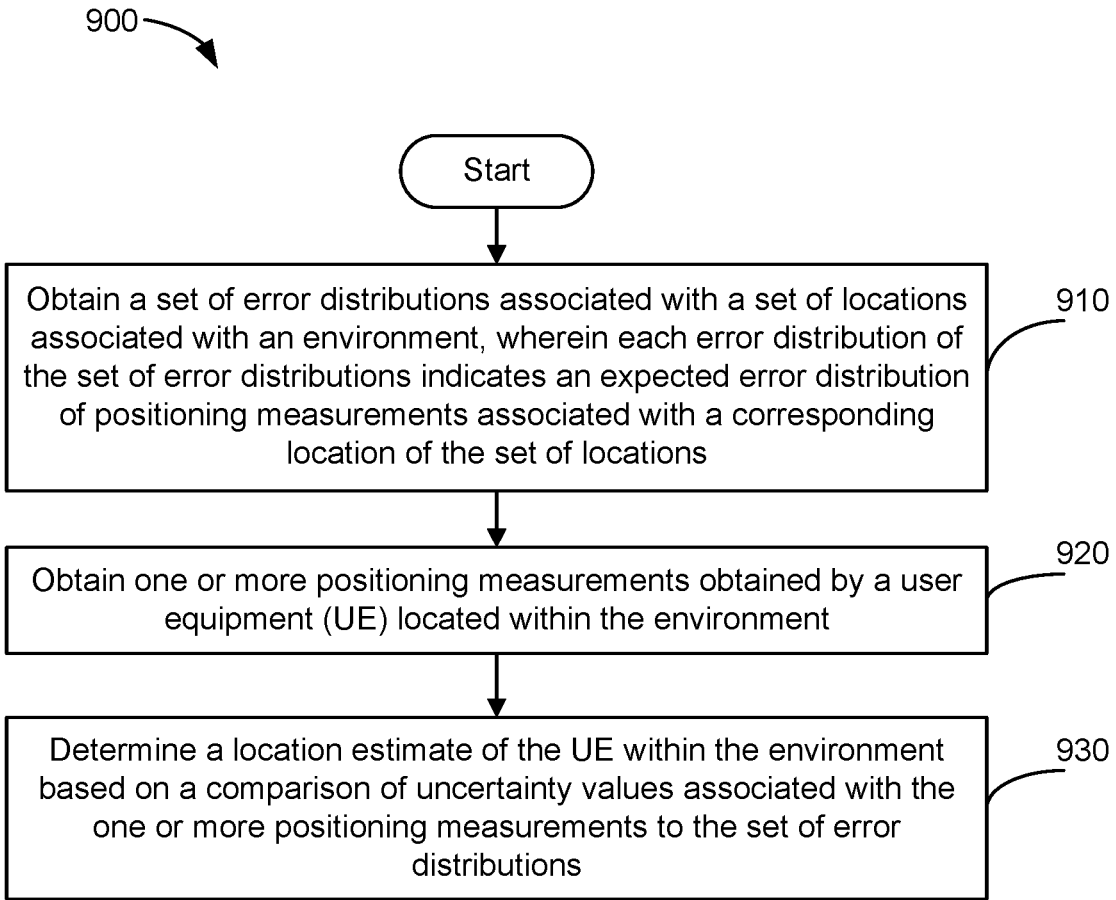

900

Start

Obtain a set of error distributions associated with a set of locations associated with an environment, wherein each error distribution of the set of error distributions indicates an expected error distribution of positioning measurements associated with a corresponding location of the set of locations — 910

Obtain one or more positioning measurements obtained by a user equipment (UE) located within the environment — 920

Determine a location estimate of the UE within the environment based on a comparison of uncertainty values associated with the one or more positioning measurements to the set of error distributions — 930

*FIG. 9*

POSITION ESTIMATION BASED ON ENVIRONMENTAL, NON-UNIFORM PRIORS

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)), and other technical enhancements. These enhancements, as well as the use of higher frequency bands, advances in PRS processes and technology, and high-density deployments for 5G, enable highly accurate 5G-based positioning.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of positioning performed by a positioning entity includes obtaining a set of error distributions associated with a set of locations associated with an environment, wherein each error distribution of the set of error distributions indicates an expected error distribution of positioning measurements associated with a corresponding location of the set of locations; obtaining one or more positioning measurements obtained by a user equipment (UE) located within the environment; and determining a location estimate of the UE within the environment based on a comparison of uncertainty values associated with the one or more positioning measurements to the set of error distributions.

In an aspect, a positioning entity includes one or more memories; one or more transceivers; and one or more processors communicatively coupled to the one or more memories and the one or more transceivers, the one or more processors, either alone or in combination, configured to: obtain a set of error distributions associated with a set of locations associated with an environment, wherein each error distribution of the set of error distributions indicates an expected error distribution of positioning measurements associated with a corresponding location of the set of locations; obtain one or more positioning measurements obtained by a user equipment (UE) located within the environment; and determine a location estimate of the UE within the environment based on a comparison of uncertainty values associated with the one or more positioning measurements to the set of error distributions.

In an aspect, a positioning entity includes means for obtaining a set of error distributions associated with a set of locations associated with an environment, wherein each error distribution of the set of error distributions indicates an expected error distribution of positioning measurements associated with a corresponding location of the set of locations; means for obtaining one or more positioning measurements obtained by a user equipment (UE) located within the environment; and means for determining a location estimate of the UE within the environment based on a comparison of uncertainty values associated with the one or more positioning measurements to the set of error distributions.

In an aspect, a non-transitory computer-readable medium stores computer-executable instructions that, when executed by a positioning entity, cause the positioning entity to: obtain a set of error distributions associated with a set of locations associated with an environment, wherein each error distribution of the set of error distributions indicates an expected error distribution of positioning measurements associated with a corresponding location of the set of locations; obtain one or more positioning measurements obtained by a user equipment (UE) located within the environment; and determine a location estimate of the UE within the environment based on a comparison of uncertainty values associated with the one or more positioning measurements to the set of error distributions.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 9 illustrates an example method of positioning, according to aspects of the disclosure.

DETAILED DESCRIPTION

Figure 1:
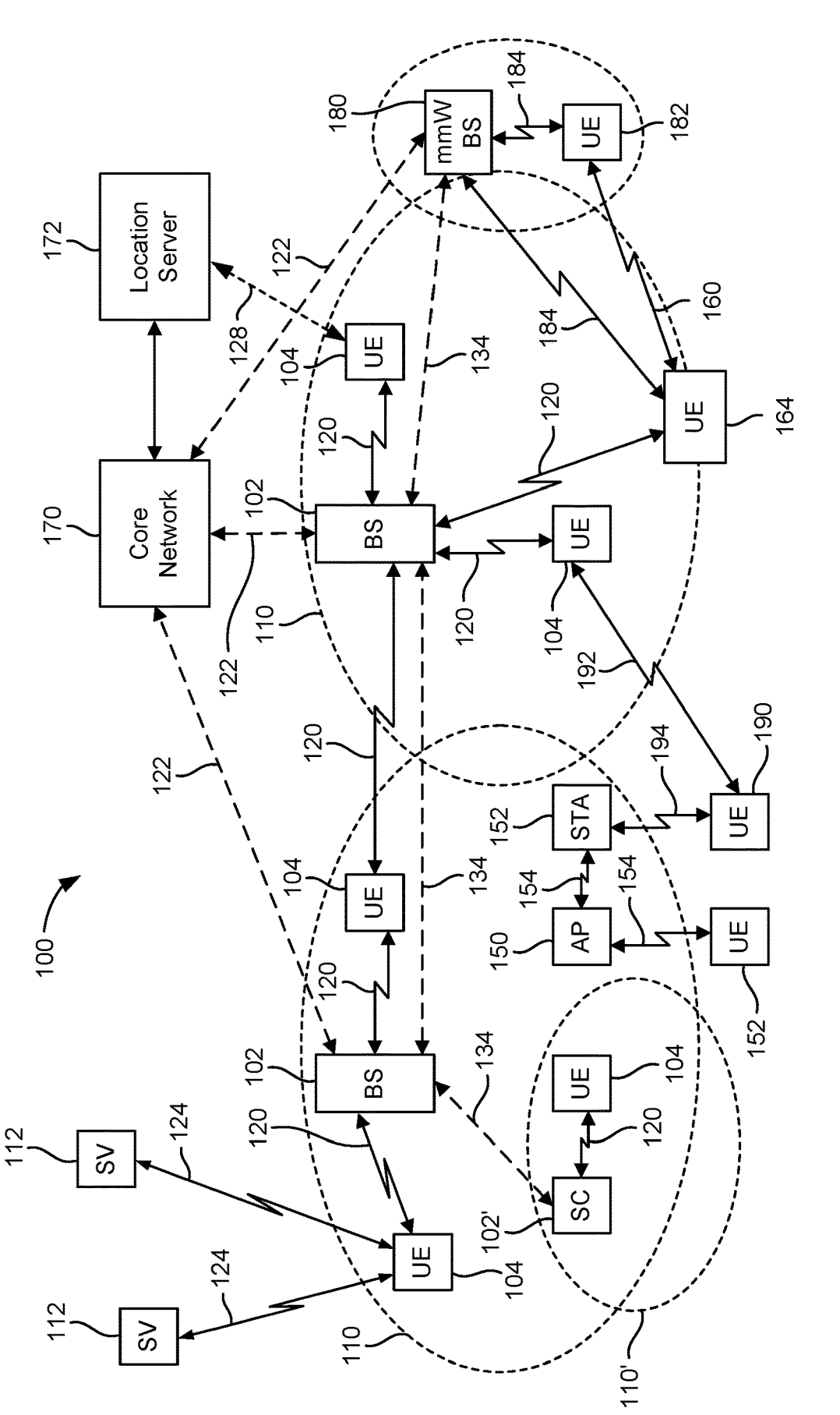
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to wireless positioning. Some aspects more specifically relate to techniques for improving position estimation using error distributions associated with a set of locations associated with (e.g., within) an environment. In some examples, a positioning entity (e.g., a server or a positioning engine operating on a user equipment (UE)) obtains a set of error distributions associated with a set of locations within an environment (e.g., an indoor environment), where each error distribution indicates an expected error distribution of positioning measurements associated with (e.g., obtained at or within a threshold distance of) a corresponding location of the set of locations. The positioning entity further obtains one or more positioning measurements obtained by a UE located within the environment. The positioning entity can then determine a location estimate of the UE within the environment based on a comparison of uncertainty values associated with the one or more positioning measurements to the set of error distributions.

Particular aspects of the subject matter described in this disclosure can be implemented to realize one or more of the following potential advantages. In some examples, by determining the location estimate of the UE based on the comparison of the uncertainty values associated with the one or more positioning measurements to the set of error distributions, the described techniques can be used to improve positioning performance, especially in "noisy" environments, such as indoor environments.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL)

channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHZ). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHZ unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHZ-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHZ-71 GHZ), FR4 (52.6 GHZ-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multifunctional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on.

Figure 2A:
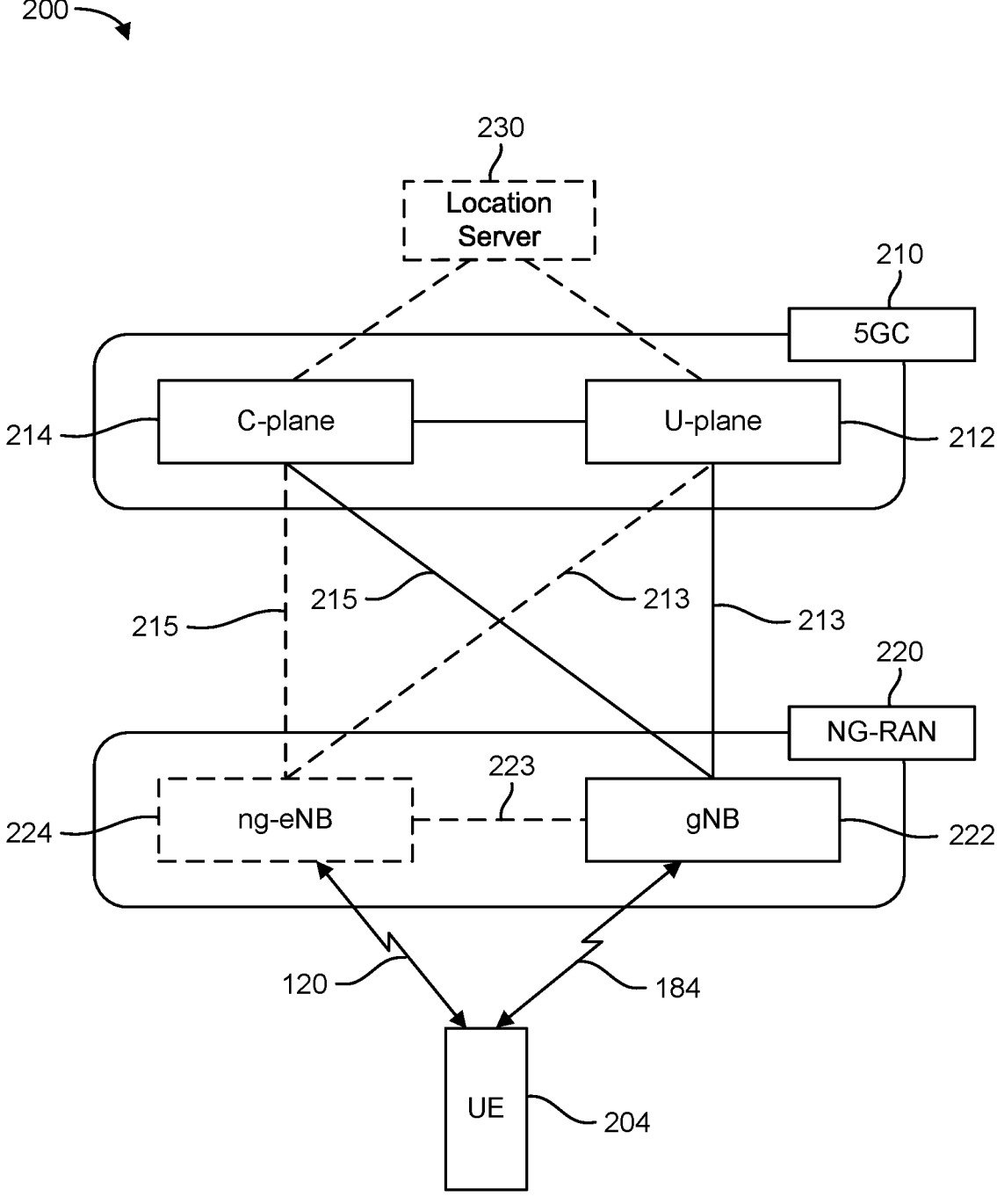
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212. (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
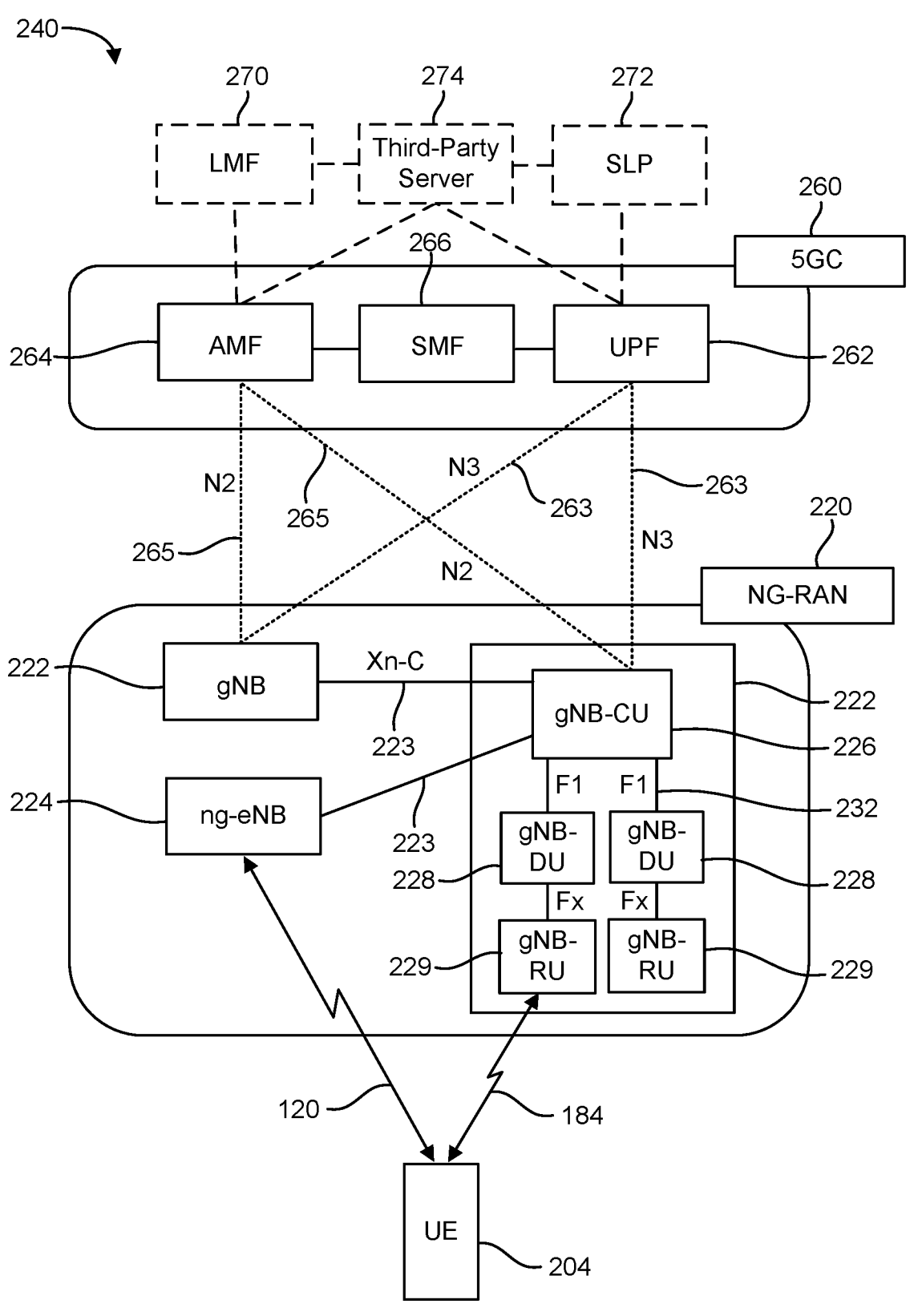

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QOS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-NB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (CNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN ALLIANCE®)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
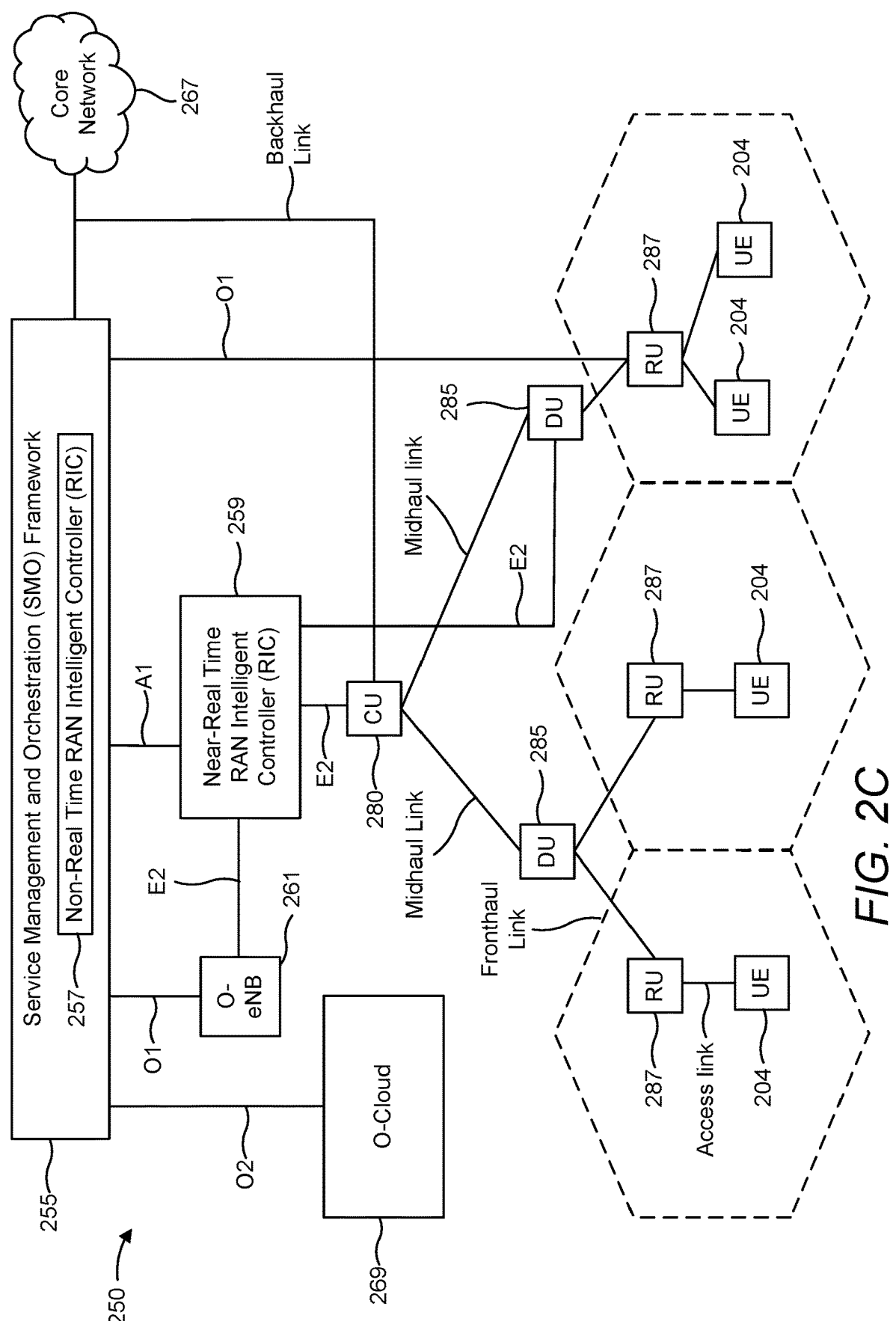

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more DUs 285 (e.g., gNB-DUs 228) via respective midhaul links, such as an F1 interface. The DUs 285 may communicate with one or more radio units (RUS) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a RF transceiver), configured to receive or transmit signals, or both, over a wireless transmission medium to one or more of the other units.

In some aspects, the CU 280 may host one or more higher layer control functions. Such control functions can include RRC, PDCP, service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a RLC layer, a MAC layer, and one or more high PHY layers (such as modules for forward error correction (FEC) encoding and decoding, scrambling, modulation and demodulation, or the like) depending, at least in part, on a functional split, such as those defined by the 3rd Generation Partnership Project (3GPP®). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUS 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, artificial intelligence/machine learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
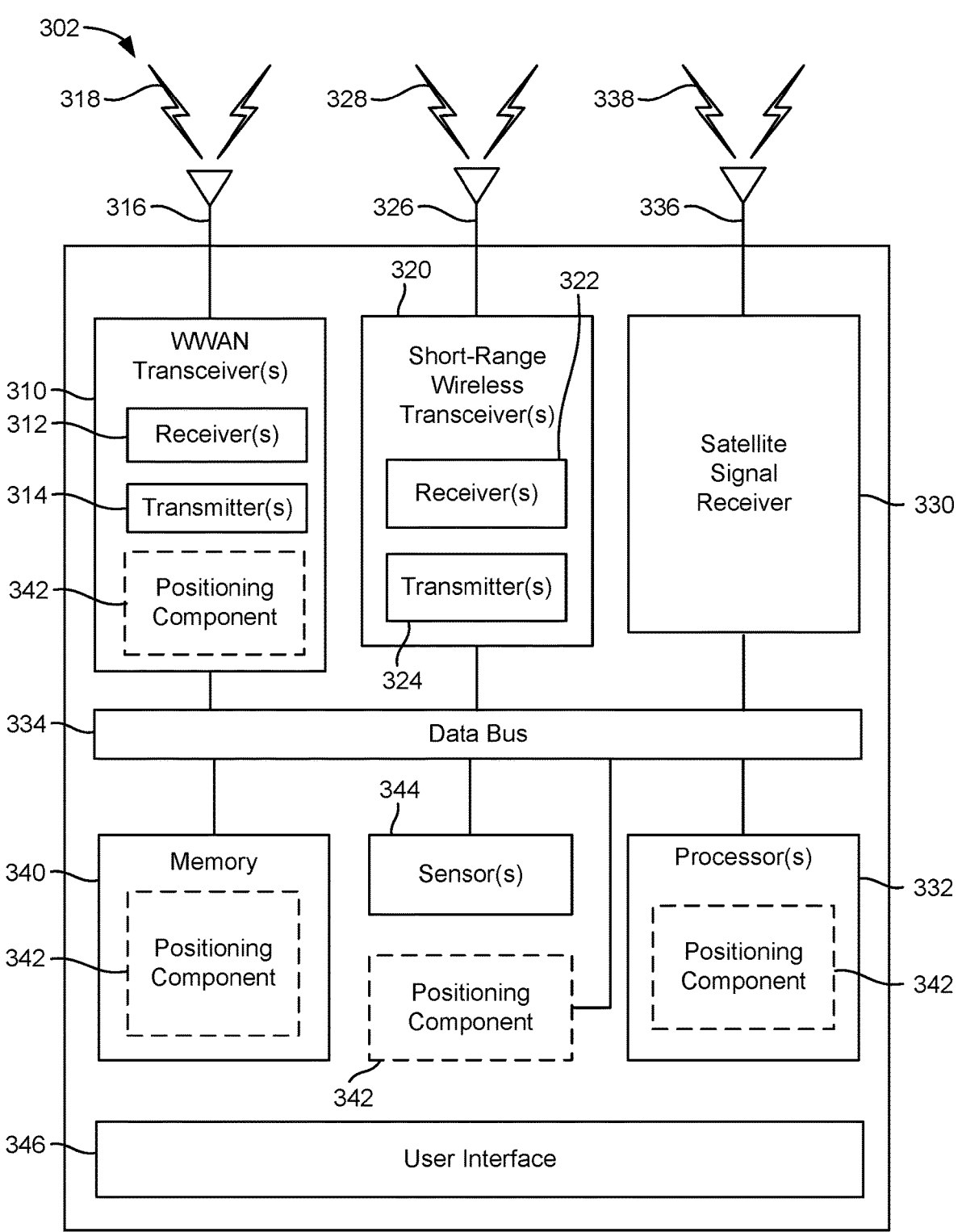
FIGS. 3A, 3B, and 3C are simplified block diagrams of several sample aspects of components that may be employed in a user equipment (UE), a base station, and a network entity, respectively, and configured to support communications as taught herein.
Figure 3B:
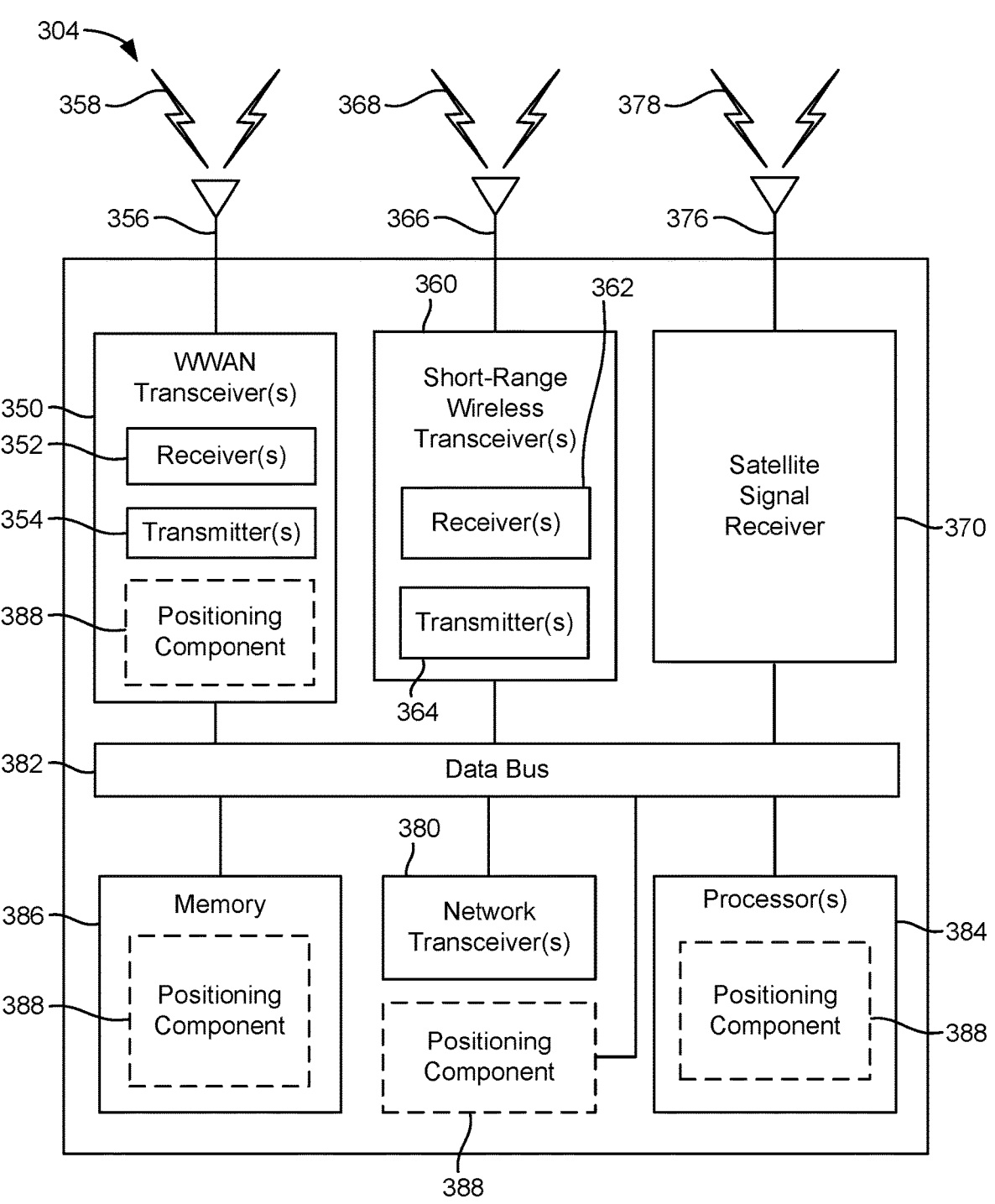
Figure 3C:
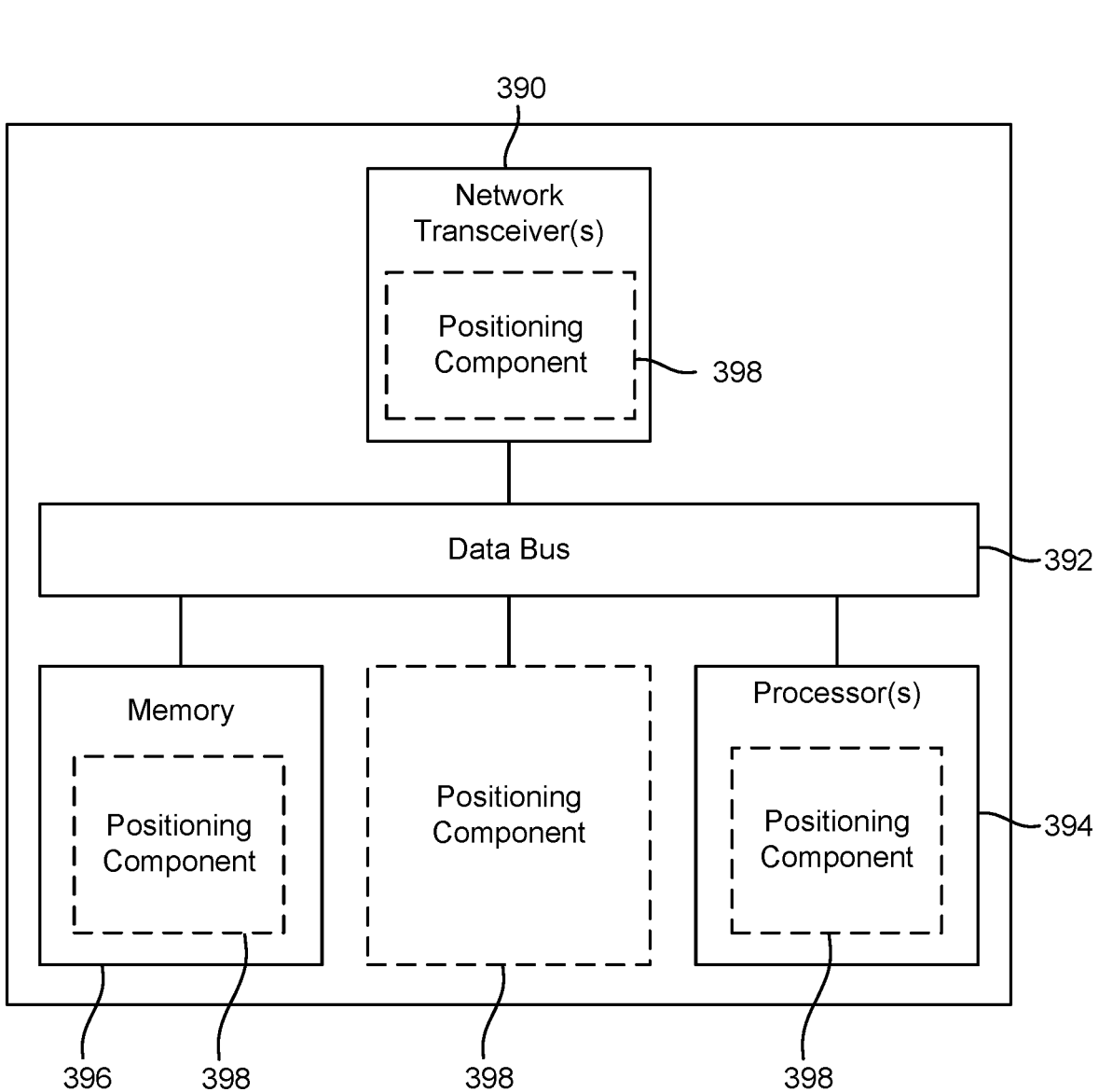

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS®) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/de-compression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical chan-nels and transport channels, multiplexing of MAC SDUs onto transport blocks (TBs), demultiplexing of MAC SDUs from TBs, scheduling information reporting, error correc-tion through hybrid automatic repeat request (HARQ), pri-ority handling, and logical channel prioritization.

Channel estimates derived by the channel estimator from a reference signal or feedback transmitted by the base station 304 may be used by the transmitter 314 to select the appropriate coding and modulation schemes, and to facili-tate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, con-trol signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide com-munication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the function-ality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor compo-nents). Also, some or all of the functionality represented by blocks 390 to 398 may be implemented by processor and memory component(s) of the network entity 306 (e.g., by execution of appropriate code and/or by appropriate con-figuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the posi-tioning component 342, 388, and 398, etc.

In some designs, the network entity 306 may be imple-mented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Figure 4:
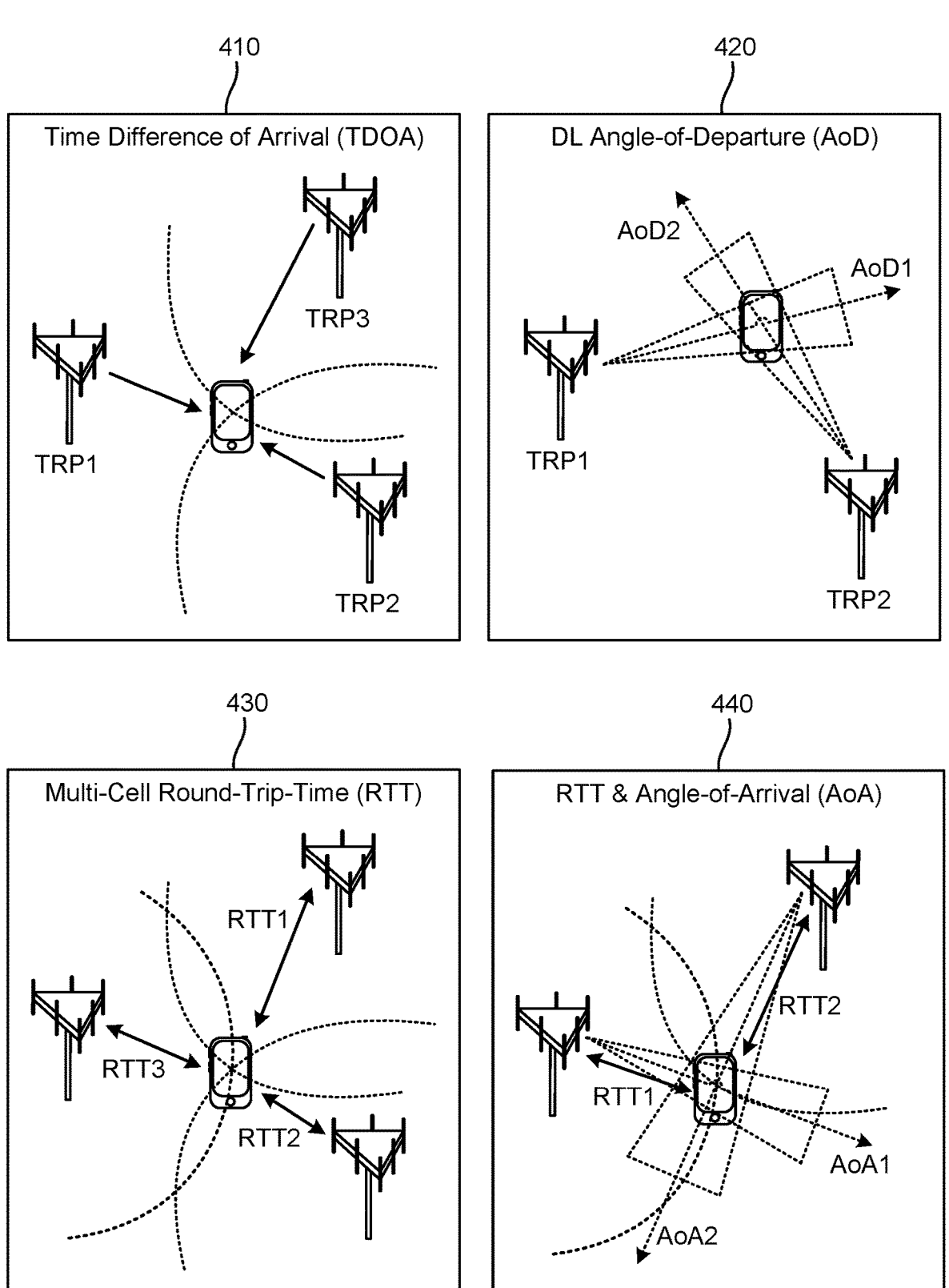
FIG. 4 illustrates examples of various positioning methods supported in New Radio (NR), according to aspects of the disclosure.

NR supports a number of cellular network-based posi-tioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. FIG. 4 illustrates examples of various positioning methods, according to aspects of the disclosure. In an OTDOA or DL-TDOA positioning procedure, illustrated by scenario 410, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, illustrated by scenario 420, the positioning entity uses a measurement report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE to multiple base stations. Specifically, a UE transmits one or more uplink reference signals that are measured by a reference base station and a plurality of non-reference base stations. Each base station then reports the reception time (referred to as the relative time of arrival (RTOA)) of the reference signal(s) to a positioning entity (e.g., a location server) that knows the locations and relative timing of the involved base stations. Based on the reception-to-reception (Rx-Rx) time difference between the reported RTOA of the reference base station and the reported RTOA of each non-reference base station, the known locations of the base stations, and their known timing offsets, the positioning entity can estimate the location of the UE using TDOA.

For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest slot boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, illustrated by scenario 430, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy, as illustrated by scenario 440.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/ TRPs of the base stations) from which to measure reference signals, the reference signal configuration parameters (e.g., the number of consecutive slots including PRS, periodicity of the consecutive slots including PRS, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (μs). In some cases, when any of the resources used for the positioning measurement are in FR1, the value range for the uncertainty of the expected RSTD may be +/−32 μs. In other cases, when all of the resources used for the positioning measurement(s) are in FR2, the value range for the uncertainty of the expected RSTD may be +/−8 μs.

NR is capable of supporting various sidelink ranging and positioning techniques. Sidelink-based ranging enables the determination of the relative distance(s) between UEs and optionally their absolute position(s), where the absolute position of at least one involved UE is known. This technique is valuable in situations where global navigation satellite system (GNSS) positioning is degraded or unavailable (e.g., tunnels, urban canyons, etc.) and can also enhance range and positioning accuracy when GNSS is available. Sidelink-based ranging can be accomplished using a three-way handshake for session establishment, followed by the exchange of positioning reference signals (PRS), and concluded by messaging to exchange measurements based on PRS transmission and receipt from peer UEs.

Sidelink ranging is based on calculating an inter-UE round-trip-time (RTT) measurement, as determined from the transmit and receive times of PRS (a wideband positioning signal defined in LTE and NR). Each UE reports an RTT measurement to all other participating UEs, along with its location (if known). For UEs having zero or inaccurate knowledge of their location, the RTT procedure yields an inter-UE range between the involved UEs. For UEs having accurate knowledge of their location, the range yields an absolute position. UE participation, PRS transmission, and subsequent RTT calculation is coordinated by an initial three-way messaging handshake (a PRS request, a PRS response, and a PRS confirmation), and a message exchange after PRS transmission (post PRS messages) to share measurements after receiving a peer UE's PRS.

Figure 5:
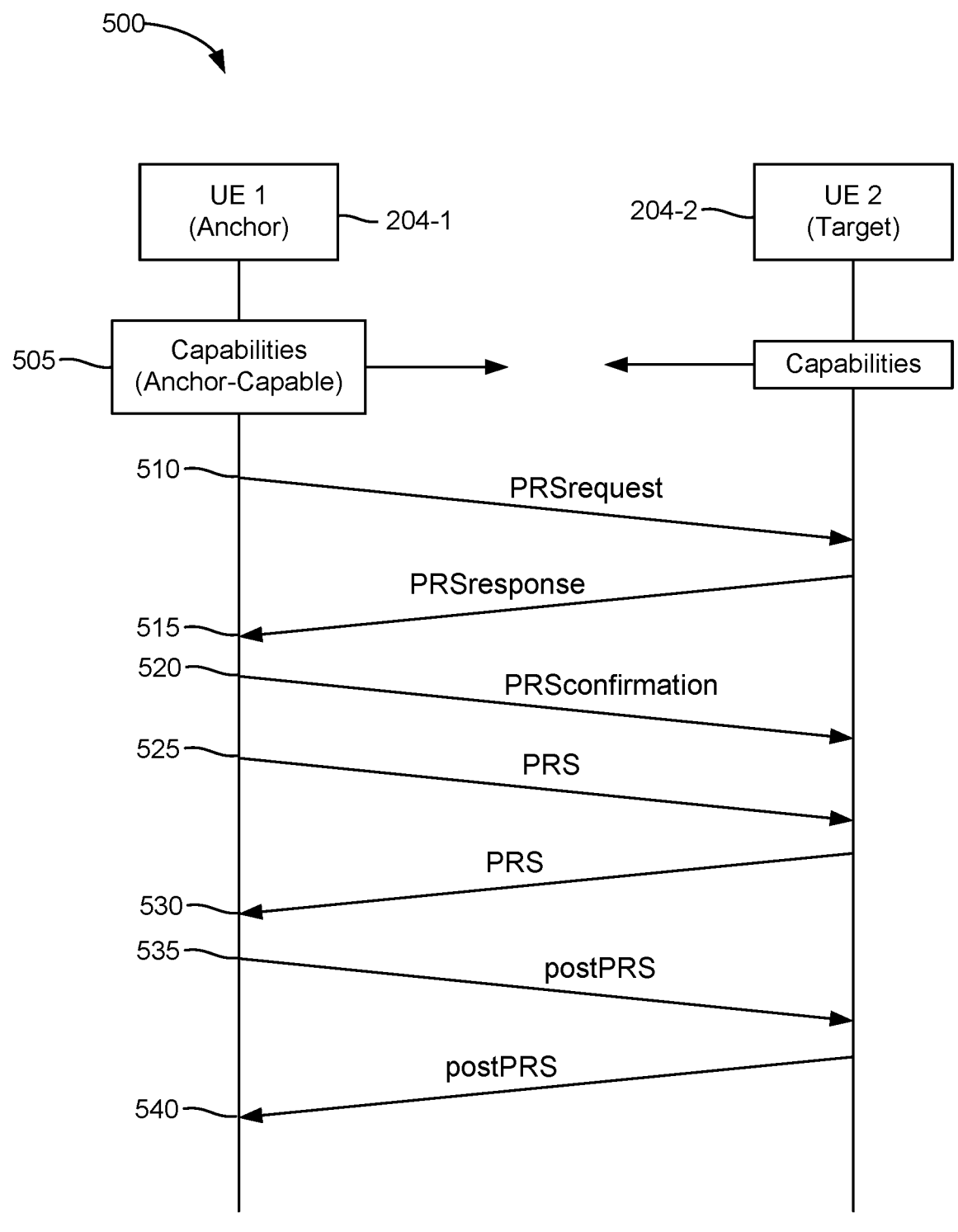
FIG. 5 is a diagram illustrating an example sidelink ranging and positioning procedure, according to aspects of the disclosure.

FIG. 5 illustrates an example sidelink ranging and positioning procedure 500, according to aspects of the disclosure. The sidelink ranging and positioning procedure 500 may also be referred to as a sidelink RTT positioning procedure. Sidelink ranging is based on calculating an inter-UE RTT measurement, as determined from the transmit and receive times of PRS (a wideband reference signal defined in LTE and NR for positioning). Each UE reports an RTT measurement to all other participating UEs, along with its location (if known). For UEs having zero or inaccurate knowledge of their location, the RTT procedure yields an inter-UE range between the involved UEs. For UEs having accurate knowledge of their location, the range yields an absolute location. UE participation, PRS transmission, and subsequent RTT calculation is coordinated by an initial three-way messaging handshake (a PRS request, a PRS response, and a PRS confirmation), and a message exchange after PRS transmission (post PRS messages) to share measurements after receiving a peer UE's PRS.

The sidelink ranging and positioning procedure 500 (or session) begins with the broadcast of capability information by the involved peer UEs at stage 505. As shown in FIG. 5, one of the peer UEs, UE 204-1 (e.g., any of the sidelink-capable UEs described herein), is capable of being an anchor UE for the sidelink ranging and positioning procedure 500, meaning it has a known location. As such, the anchor UE 204-1 includes an indication in its capability message(s) that it is capable of being an anchor UE for the sidelink ranging and positioning procedure 500. The capability message(s) may also include the location of the anchor UE 204-1, or this may be provided later. The other UE, UE 204-2 (e.g., any other of the sidelink-capable UEs described herein), is a target UE, meaning it has an unknown or inaccurate location and is attempting to be located. Based on the capability information received from the anchor UE 204-1, indicating that the anchor UE 204-1 is an anchor UE, the target UE 204-2 knows that it will be able to determine its location based on performing the sidelink ranging and positioning procedure 500 with the anchor UE 204-1.

After the initial capability exchange, the involved UEs 204 perform a three-way messaging handshake. At stage 510, the anchor UE 204-1 transmits a PRS request (labeled "PRSrequest") to the target UE 204-2. At stage 515, the target UE 204-2 transmits a PRS response (labeled "PRSresponse") to the anchor UE 204-1. At stage 520, the anchor UE 204-1 transmits a PRS confirmation (labeled "PRSconfirmation") to the target UE 204-2. At this point, the three-way messaging handshake is complete. Note that although FIG. 5 illustrates the anchor UE 204-1 initiating the three-way message handshake, it may instead be initiated by the target UE 204-2.

At stages 525 and 530, the involved peer UEs 204 transmit PRS to each other. The resources on which the PRS are transmitted may be configured/allocated by the network (e.g., a serving base station of one of the UEs 204) or negotiated by the UEs 204 during the three-way messaging handshake. The anchor UE 204-1 measures the transmission-to-reception (Tx-Rx) time difference between the transmission time of PRS at stage 525 and the reception time of PRS at stage 530. The target UE 204-2 measures the reception-to-transmission (Rx-Tx) time difference between the reception time of PRS at stage 525 and the transmission time of PRS at stage 530. Note that although FIG. 5 illustrates the anchor UE 204-1 transmitting PRS first, the target UE 204-2 may instead transmit PRS first.

At stages 535 and 540, the peer UEs 204 exchange their respective time difference measurements in post PRS messages (labeled "postPRS"). If the anchor UE 204-1 has not yet provided its location to the target UE 204-2, it does so at this point. Each UE 204 is then able to determine the RTT between each UE 204 based on the Tx-Rx and Rx-Tx time difference measurements (specifically, the difference between the Tx-Rx and Rx-Tx time difference measurements). Based on the RTT measurement and the speed of light, each UE 204 can then estimate the distance (or range) between the two UEs 204 (specifically, half the RTT measurement multiplied by the speed of light). Since the target UE 204-2 also has the absolute location (e.g., geographic coordinates) of the anchor UE 204-1, the target UE 204-2 can use that location and the distance to the anchor UE 204-1 to determine its own relative location.

Note that while FIG. 5 illustrates two UEs 204, a target UE 204-2 may perform the sidelink ranging and positioning procedure 500 with multiple anchor UEs 204-1. If the target UE 204-2 has the absolute locations of multiple anchor UEs 204-1, the target UE 204-2 can determine its absolute location based on the range measurements to the multiple anchor UEs 204-1 and the absolute locations of the anchor UEs 204-1.

The various Wi-Fi standards also support various Wi-Fi-based positioning techniques. For example, IEEE 802.11az standard (which is based on the IEEE 802.11ax standard) introduces enhancements for Wi-Fi-based ranging. A Wi-Fi-based ranging procedure is a type of RTT procedure, and is based on the transmit and receive times of null data packet (NDP) frames at an initiating STA (ISTA) and a responding STA (RSTA). In a Wi-Fi-based ranging procedure, the ISTA is typically a UE, such as a user device, asset tag, or the like, and the RSTA is typically a Wi-Fi AP. An NDP frame is a ranging frame, and comprises the preamble along with some PHY headers—it does not include a payload. An NDP transmitted by the RSTA to an ISTA is denoted as an "R2I NDP" and an NDP transmitted by an ISTA to an RSTA is denoted as an "I2R NDP."

Figure 6:
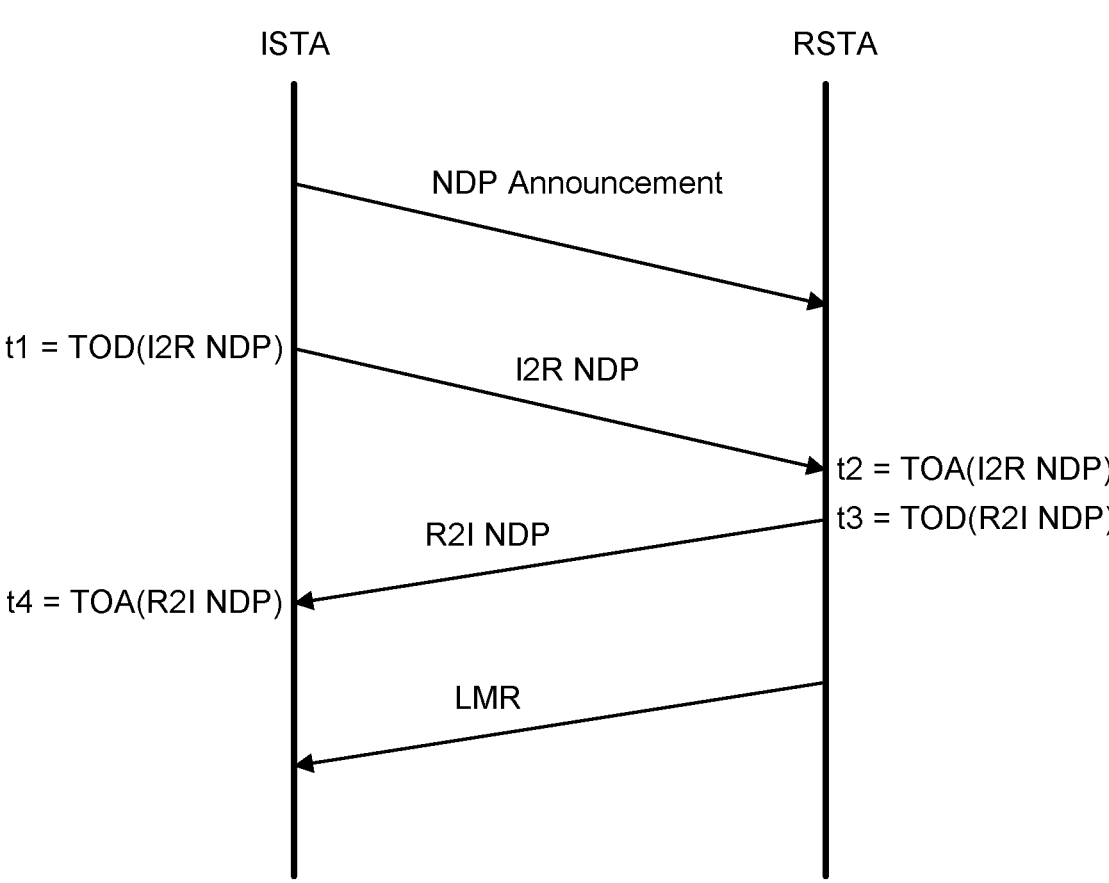
FIG. 6 is a timing diagram of an example measurement sounding phase and measurement reporting phase of a non-trigger-based (non-TB) ranging procedure as defined in the Institute of Electrical and Electronics Engineers (IEEE) 802.11az standard.

FIG. 6 is a timing diagram 600 of an example measurement sounding phase and measurement reporting phase of a non-trigger-based (non-TB) ranging procedure as defined in the IEEE 802.11az, according to aspects of the disclosure. In a non-TB ranging procedure, the RSTA broadcasts a beacon (not shown) to inform ISTAs which channel(s) are available for non-TB ranging. An ISTA then initiates the ranging session on one of the channels using carrier sense multiple access with collision avoidance (CSMA/CA). As shown in FIG. 6, an ISTA initiates the ranging session by transmitting an NDP announcement to notify the RSTA that it will be transmitting an I2R NDP for which the RSTA should monitor. After the NDP announcement frame is transmitted successfully, the involved STAs can retain the channel since the gap between the subsequent packets is no longer than the shortest interframe spacing (SIFS) defined for Wi-Fi communication.

During the measurement sounding phase, each STA transmits an NDP frame to the other STA, as illustrated in FIG. 6. The ISTA measures the transmission time, or time-of-departure (ToD), of the I2R NDP transmitted to the ISTA (denoted "t1") and the reception time, or time-of-arrival (ToA), of the R2I NDP received from the ISTA (denoted "t4"). The RSTA measures the reception time/ToA of the I2R NDP received from the ISTA (denoted "t2") and the transmission time/ToD of the R2I NDP transmitted to the ISTA (denoted "t3").

After the measurement sounding phase, the RSTA transmits a location measurement report (LMR) to the ISTA during a measurement reporting phase. The LMR includes the reception time/ToA of the I2R NDP ("t2") and the transmission time/TOD of the R2I NDP ("t3"). If available, the RSTA may also include the angle of arrival (AoA) of the I2R NDP and/or the angle-of-departure (AoD) of the R2I NDP. The LMR may also include the geographic location of the RSTA, if known. Based on the timing measurements from the RSTA and its own timing measurements ("t1" and "t4"), the ISTA can determine the time-of-flight (ToF) between itself and the RSTA, and therefore the range/distance between itself and the RSTA.

An ISTA may perform a ranging procedure with one or more RSTAs. For RSTAs having zero or inaccurate knowledge of their location, the ranging procedure yields an inter-STA range (distance) between the involved STAs. For RSTAs having accurate knowledge of their location, the range can yield an absolute position if at least three involved RSTAs have known locations, or angle-based information (e.g., AoA/AOD) for at least one RSTA is available (note that the ISTA may also be able to determine AoA and/or AoD measurements that can further be used to enhance the position estimate).

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error and/or uncertainty (e.g., by including an area or volume within which the location is expected to be included with some specified or default level of confidence).

Currently, the error (the difference between the actual value and the measured value) and/or uncertainty (an estimate of the range between the actual value and the measured value) associated with a position estimate is based on the assumption that positioning errors are random and their distributions are consistent with the normal distribution. That is, for current position estimation algorithms, the expected measurement error distribution, if used at all, is considered to be constant (i.e., the same for all measurements). For example, when solving a set of range estimates, it is typical to derive a set of equations (usually linearized) to minimize. This process is a minimization of cost, or some function of residual errors, and may be achieved directly through solving a system of equations in matrix form, iteratively (as in GPS systems), or using any of a number of standard numerical methods.

In practice, however, positioning errors do not appear in a random way, since the position determination is typically performed iteratively. Some of this problem would be ameliorated if the uncertainty/confidence values associated with the positioning measurements (e.g., time of arrival, angle of arrival, time of flight, etc.) were reliable (i.e., accurate), but this is not usually the case. For example, it has been observed that a measuring unit (e.g., a UE) may frequently report uncertainty values for RTT measurements (e.g., in a Wi-Fi system) that are several hundred times greater than the reported standard deviations in error.

Figure 7:
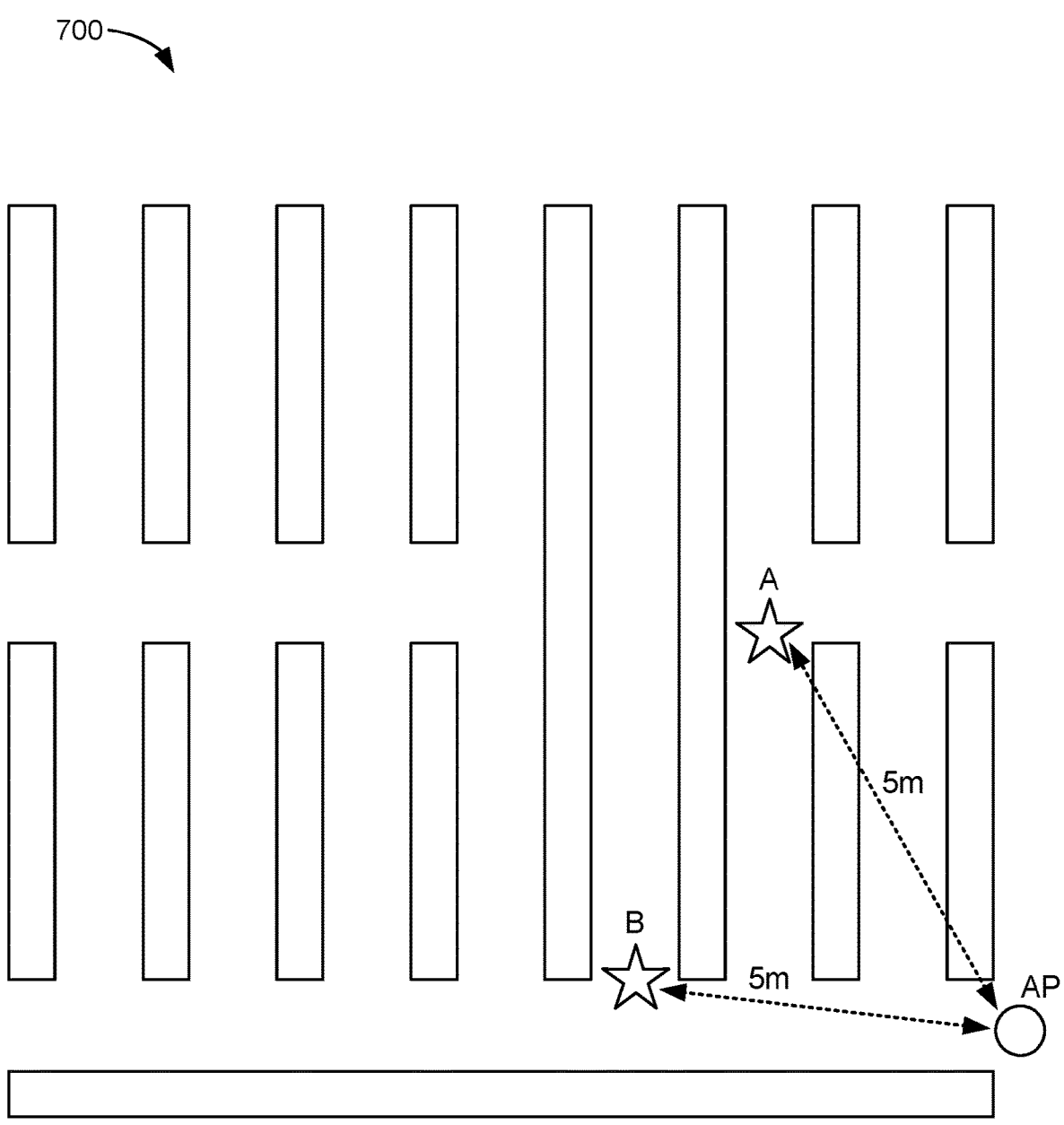
FIG. 7 is a diagram illustrating an example positioning scenario, according to aspects of the disclosure.

FIG. 7 is a diagram 700 illustrating an example positioning scenario, according to aspects of the disclosure. In the example of FIG. 7, a mobile device (e.g., a handheld UE) is located in an indoor environment, such as a grocery store or warehouse. The rectangles represent shelving units and the space between the rectangles represent aisles within which the mobile device may be located. While located in the indoor environment, the mobile device exchanges positioning signals (e.g., SRS and PRS, I2R NDP and R2I NDP) with an access point (AP) (e.g., a Wi-Fi access point) at a known location to determine, or aid in the determination of, a position estimate of the mobile device.

For example, the mobile device may have measured an RTT value (e.g., for a sidelink or Wi-Fi-based positioning procedure) corresponding to 6 meters (m) from the access point. A positioning engine may consider the likelihood that the mobile device is at one of two positions, denoted "A" and "B" in FIG. 7. As shown, both positions A and B are 5 m from the access point. In this single measurement example, the residual error is 1 m, which is the difference between the actual distance (5 m) and the measured distance (6 m). A standard method for estimating the position of the mobile device would be to try to minimize a value arising from the residual error (1 m). This may be accomplished by minimizing a cost function, or implicitly by solving a set of equations in matrix form. However, whatever the approach, the contribution to the overall residual error at the estimated position of the mobile device is the same for positions A and B (1 m). The weight of each measurement in the position fix may be derived from an uncertainty value derived from, for example, the uncertainty in the transmitter position (e.g., the location of the access point) and the uncertainty arising from the measurement made by the mobile device itself (e.g., width of the correlation peak, signal strength value).

However, as an example, with continued reference to FIG. 7, at position B, the RTT measurement may be consistent and accurate, whereas at position A, the RTT measurement may vary considerably from one moment to the next. In this case, it may be far more likely that a measurement of 6 m was made at position B than at position A, for example. In other words, the estimated position will affect the value of the uncertainty associated with each measurement. This can have a profound effect on the final position estimate.

The present disclosure provides techniques to use an estimate of the expected error distribution of positioning measurements at each putative position of a mobile device within an environment (e.g., positions A and B in FIG. 7). In that way, the uncertainty of a positioning measurement (and hence the weight attached to it in the position calculation) would vary according to the putative position of the mobile device. For example, in a supermarket where there are areas with high shelves and other areas that are much more open, range measurements (RTT, time of flight, angle of arrival, received signal strength indication (RSSI), etc.) from nearby transmitters would be expected to have larger errors in shelved aisle areas than in the open areas. This can make a considerable difference in the probability of a 1 m error coming from one part of the store over another.

The error distribution at different points (i.e., different possible locations of a mobile device) over an area of interest (e.g., the indoor environment illustrated in FIG. 7) may be known in detail, due to a thorough survey or sophisticated modelling of the environment, or may not be known very well, with areas broadly marked as being "noisy" or "clean" for obtaining positioning measurements. The latter may be based on an analysis of a floor plan of the environment or crowdsourced based on measurements from multiple mobile devices in the environment (over time).

Figure 8:
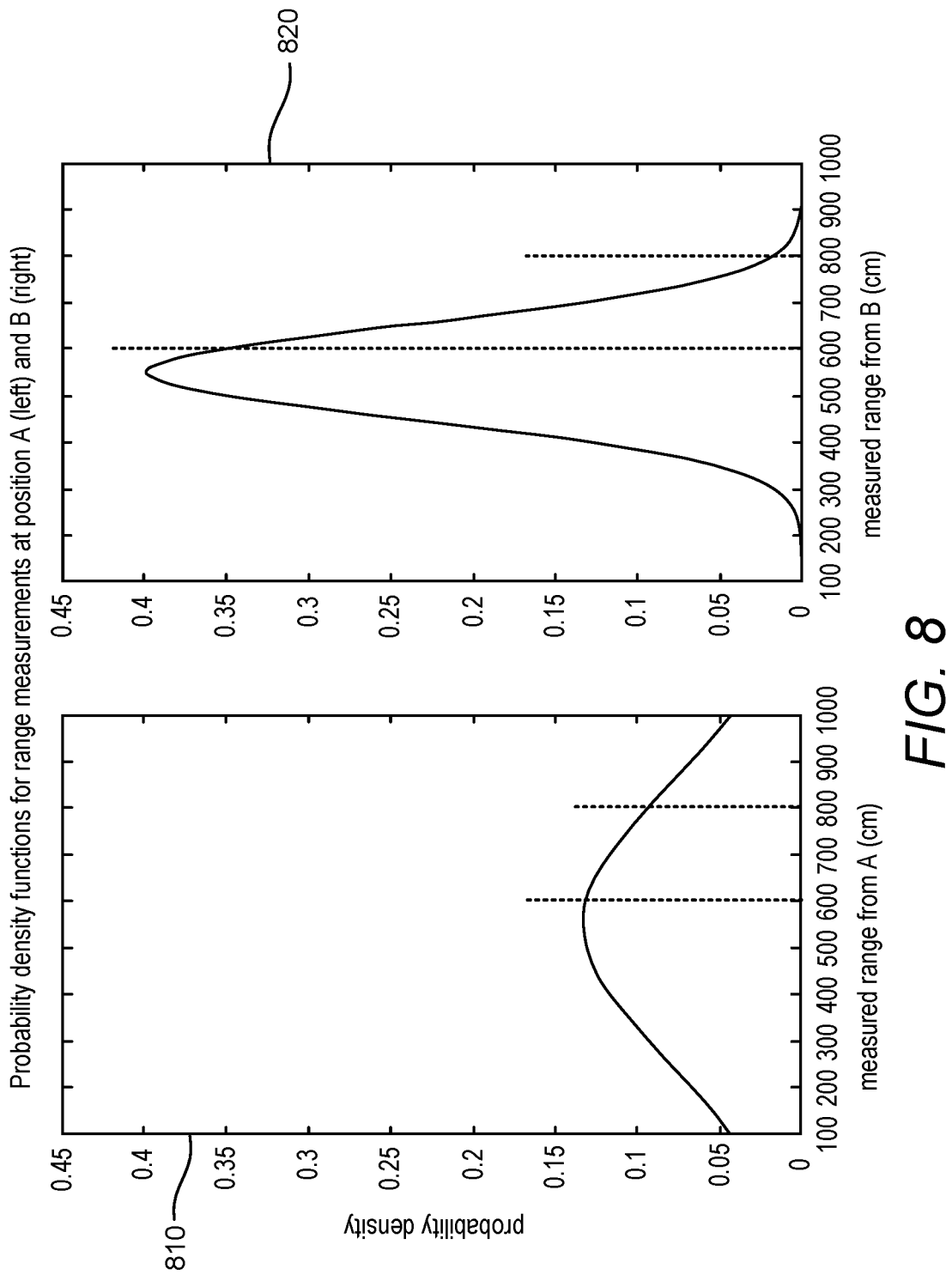
FIG. 8 illustrates example error distribution functions for range measurements at positions "A" and "B" in FIG. 7, according to aspects of the disclosure.

FIG. 8 illustrates example error distributions for range measurements at positions "A" and "B" in FIG. 7, according to aspects of the disclosure. Specifically, graph 810 illustrates an example probability density function for range measurements (e.g., RTT measurements) at position "A" and graph 820 illustrates an example probability density function for range measurements at position "B." For simplicity, the graphed probability density functions are Gaussian distributions, as this method is independent of the actual distribution, which is likely to be non-parametric.

Although both distributions have a peak in the same place (approximately 550 centimeters (cm)), a measurement of 6 m (i.e., 600 cm) is three times more likely to be selected from position B's distribution than from position A's distribution. Considering this RTT value in isolation, if an RTT measurement of 6 m is obtained, it is three times more likely that the mobile device that obtained the measurement is located at position B than position A. Conversely, a measurement of 8 m is about ten times more likely to have been obtained at position A than at position B.

In probabilistic terms, this is because of unequal prior distributions. Although this phenomenon is well-known in Bayesian probability, traditional methods of solving for the position estimate do not take this into account. Indeed, it is unlikely to have a large impact on outdoor positioning for GNSS, for example, where the prior distributions of error at nearby points are typically very similar. However, indoors, and in particular in environments where there are regular structures in some areas and not others, such as in supermarkets, warehouses, libraries, and the like, there can be large differences in prior distributions of error even for positions that are close to each other. This is also true where terrestrial ranging technologies are used in noisy outdoor environments (e.g., urban environments, wooded environments, etc.).

Conventional positioning methods treat all possible solutions as if they have equal priors or probabilities. However, they do not, and in fact, as discussed above with reference to FIGS. 7 and 8, they may have very different error distributions. The present disclosure provides techniques in which the difference in prior distributions among candidate position solutions is considered. The probability distribution information at different points within an environment can be used in any number of ways. For example, for a position estimate based on several RTT measurements, the sigma value (i.e., how far the RTT measurement is from the average) associated with each RTT measurement would be adjusted (e.g., multiplicatively) by the probability of the measurement given the putative position of the mobile device. This would encourage correct values of the measurements to be in accurate, reliable positions within the environment, and penalize values that have large errors more severely in the same areas. This is the correct way to handle the difference in prior distributions among candidate position solutions. In contrast, current positioning methods treat all possible solutions as if they have equal priors or probabilities. However, they do not, and in fact, as discussed above with reference to FIGS. 7 and 8, they may have very different error distributions.

The techniques described herein involve a type of Bayesian treatment of RTT measurements. A similar approach can be taken with other measurements (e.g., RSSI, time of flight, angle of arrival, etc.). A positioning method that uses comprehensive RTT values as "fingerprints" of the environment, matching these to the measurement sets, would be one possible implementation of this approach.

Another position estimation method would be to minimize a cost function. For example, the residual error in the cost function would be a difference between the measured RTT and an estimated RTT between the access point and a putative position of the mobile device, and a punitive position having a minimum cost function value would be determined as the estimated position. Let the residual error of an RTT measurement at a given point P=(x, y) be given by ε. An example cost function may then be of the form:

$$C = \sum_i \varepsilon_i^2 \cdot \frac{w_i}{\rho(\varepsilon_i, x_i, y_i)}$$

In the above equation, the sum is over all range residuals $\varepsilon_i$ of an access point i. The conventional weight, $w_i$, is a measure of uncertainty/confidence in the location of the access point and the quality of the measurement, if such a value exists in the system. The value $\rho(\varepsilon_i, x_i, y_i)$ represents a moderating factor based on, for example, the probability density function of the error from access point i at position P. Note that the positioning method cannot simply apply an extra cost for a measurement depending on the variance of the RTT measurement at P, since this will simply add more cost to those points at which the measurement is reliable than others, regardless of how accurate the measurement is. This simply increases the probability of the mobile device being in a poor environment irrespective of measurement quality.

The proposed techniques for addressing the uneven nature of prior probabilities may be implemented with a particle filter. A particle filter (or "particle cloud") is often used for indoor positioning. A particle filter is initialized by placing some number of particles (e.g., several thousand or more) around the indoor environment. As soon as the mobile device begins taking measurements, sensor readings, and/or the like, particles that are consistent with the obtained measurements, sensor readings, and/or the like are up-weighted while particles that are inconsistent are down-weighted. Particles that collide with obstacles (if known) are eliminated.

Accordingly, each RTT measurement may be used separately to adjust the weights (either up or down) of the particles. A probability value of the measurement at each particle's location may be extracted from the corresponding probability density function at that point in the environment, and that probability density function may be used directly as a multiplicative factor in reweighting (up or down) the particle.

Although the example above relates to RTT measurements, as will be appreciated, the techniques described herein are equally applicable to other measurements that may be affected by the environment, such as RSSI, angle of arrival, time of flight, time of arrival, and the like.

Additionally, environmental obstructions can be structural (e.g., shelving units, walls, metallic surfaces, etc.) or transient (e.g., occlusion due to a person carrying the mobile device, or due to mobile obstructions in the environment, such as other people, robots, and the like). Thus, if the mobile device is being held by, for example, a shopper, the heading of the person may alter the expected error distribution of measurements differently, according to the person's location.

FIG. 9 illustrates an example method 900 of positioning, according to aspects of the disclosure. In an aspect, method 900 may be performed by a positioning entity (e.g., a location server, an over-the-top (OTT) server, a positioning engine executing on a UE, etc.).

At operation 910, the positioning entity obtains a set of error distributions (e.g., probability density functions, such as illustrated in FIG. 8) associated with a set of locations (e.g., at least positions "A" and "B" in FIG. 7) associated with (e.g., within) an environment (e.g., an indoor environment, such as a store, warehouse, etc.), where each error distribution of the set of error distributions indicates an expected error distribution of positioning measurements associated with (obtained at or within a threshold distance of) a corresponding location of the set of locations. In an aspect, where the positioning entity is a server, operation 910 may be performed by the one or more network transceivers 390, the one or more processors 394, memory 396, and/or positioning component 398, any or all of which may be considered means for performing this operation. Where the positioning entity is positioning engine of a UE, operation 910 may be performed by the one or more WWAN transceivers 310, the one or more processors 332, memory 340, and/or positioning component 342, any or all of which may be considered means for performing this operation.

In an aspect, the set of error distributions may be obtained based on a survey of the environment, a map (e.g., floor map) of the environment, crowdsourced positioning measurements of the environment (e.g., from other mobile devices currently in the environment or having been located in the environment within some previous amount of time, such as a day, a week, a month, etc.), or any combination thereof. Further, the set of error distributions may be received from a remote server (e.g., another location server, another OTT server, etc.) or accessed from a memory of the positioning entity, for example.

At operation 920, the positioning entity obtains one or more positioning measurements obtained by a UE located within the environment. In an aspect, where the positioning entity is a server, operation 920 may be performed by the one or more network transceivers 390, the one or more processors 394, memory 396, and/or positioning component 398, any or all of which may be considered means for performing this operation. Where the positioning entity is positioning engine of a UE, operation 920 may be performed by the one or more WWAN transceivers 310, the one or more processors 332, memory 340, and/or positioning component 342, any or all of which may be considered means for performing this operation.

In an aspect, the one or more positioning measurements may include one or more timing measurements (e.g., time of arrival, time of flight, RTT, TDOA, etc.), one or more angle-based measurements (e.g., angle-of-arrival), one or more signal strength measurements (e.g., RSSI, SINR, RSRP, RSRQ, etc.), or any combination thereof. The one or more positioning measurements may be measurements of one or more reference signals (e.g., DL-PRS, NDP frames, etc.) transmitted by one or more access points (e.g., Wi-Fi access points, cellular base stations, or other transmission points) within the environment. Alternatively, in a sidelink scenario, the one or more reference signals may be SL-PRS. The one or more positioning measurements may be obtained by the UE during a cellular-based positioning procedure, as illustrated in FIG. 4, a sidelink-based positioning procedure, as illustrated in FIG. 5, a Wi-Fi-based positioning procedure, as illustrated in FIG. 6, or the like.

Where the positioning entity is a location server (e.g., LMF 270), the one or more positioning measurements may be obtained from the UE via, for example, Long-Term Evolution (LTE) positioning protocol (LPP) signaling (e.g., in an LPP Provide Location Information message). Where the positioning entity is an OTT server, the one or more positioning measurements may be obtained from the UE via some proprietary interface between the UE and the OTT server. Where the positioning entity is a positioning engine executing on the UE, the one or more positioning measurements may be obtained by the positioning engine from, for example, a memory of the UE or a transceiver of the UE.

At operation 930, the positioning entity determines a location estimate of the UE (e.g., 2D or 3D coordinates of the UE and/or a range(s)/distance(s) between the UE and the one or more access point) within the environment based on a comparison of uncertainty values associated with the one or more positioning measurements to the set of error distributions. In an aspect, where the positioning entity is a server, operation 930 may be performed by the one or more network transceivers 390, the one or more processors 394, memory 396, and/or positioning component 398, any or all of which may be considered means for performing this operation. Where the positioning entity is positioning engine of a UE, operation 930 may be performed by the one or more WWAN transceivers 310, the one or more processors 332, memory 340, and/or positioning component 342, any or all of which may be considered means for performing this operation.

In an aspect, determining the location estimate of the UE at operation 930 may include the positioning entity discarding positioning measurements of the one or more positioning measurements that are inconsistent with an error distribution of the set of error distributions associated with the location estimate of the UE. The positioning measurements of the one or more positioning measurements being inconsistent with the error distribution of the set of error distributions may include the positioning measurements of the one or more positioning measurements being less likely than a threshold (e.g., 60%, 80%) to have been obtained at the location estimate of the UE based on a comparison of uncertainty values associated with the positioning measurements to the error distribution. For example, as discussed above with reference to FIGS. 7 and 8, it is more likely that a measurement of 6 m was made at position B than at position A, and therefore, if the coarse location of the UE is determined to be at position A, then the measurement of 6 m may be discarded.

In an aspect, the positioning entity may weight the one or more positioning measurements based on a comparison of the one or more positioning measurements to an error distribution of the set of error distributions. The error distribution of the set of error distributions may be selected based on a coarse location estimate of the UE, a previous location estimate of the UE, a trajectory of the UE, or any combination thereof. Higher weights may be assigned to positioning measurements of the one or more positioning measurements that are more consistent with the error distribution and lower weights may be assigned to positioning measurements of the one or more positioning measurements that are less consistent with the error distribution. In this case, the location estimate of the UE may be determined based on positioning measurements of the one or more positioning measurements having a weight above a threshold.

In an aspect, the location estimate of the UE within the environment may be based on a two-dimensional or three-dimensional point cloud representing a plurality of estimated positions of the UE within the environment. In this case, the positioning entity may prune (and/or down-weight) points from the point cloud that are based on positioning measurements of the one or more positioning measurements that are inconsistent with error distributions of the set of error distributions associated with the points.

As will be appreciated, a technical advantage of the method 900 is improved positioning performance, especially in "noisy" environments, such as indoor environments. Even greater advantage may be gained in environments where the (RF) signal quality changes significantly over a small area. Some of these will be "noisy," some will be where there are areas subject to more or less multipaths close to each other, or where there are obstacles that affect the signal quality in one location but not in another nearby location (e.g., where one or more signals are obscured by the user in one location but not in another nearby location).

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, where each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of positioning performed by a positioning entity, comprising: obtaining a set of error distributions associated with a set of locations associated with an environment, wherein each error distribution of the set of error distributions indicates an expected error distribution of positioning measurements associated with a corresponding location of the set of locations; obtaining one or more positioning measurements obtained by a user equipment (UE) located within the environment; and determining a location estimate of the UE within the environment based on a comparison of uncertainty values associated with the one or more positioning measurements to the set of error distributions.

Clause 2. The method of clause 1, further comprising: discarding positioning measurements of the one or more positioning measurements that are inconsistent with an error distribution of the set of error distributions associated with the location estimate of the UE.

Clause 3. The method of clause 2, wherein the positioning measurements of the one or more positioning measurements being inconsistent with the error distribution of the set of error distributions comprises the positioning measurements of the one or more positioning measurements being less likely than a threshold to have been obtained at the location estimate of the UE based on a comparison of uncertainty values associated with the positioning measurements to the error distribution.

Clause 4. The method of any of clauses 1 to 3, wherein determining the location estimate of the UE comprises: weighting the one or more positioning measurements based on a comparison of the one or more positioning measurements to an error distribution of the set of error distributions.

Clause 5. The method of clause 4, wherein the error distribution of the set of error distributions is selected based on: a coarse location estimate of the UE, a previous location estimate of the UE, a trajectory of the UE, or any combination thereof.

Clause 6. The method of any of clauses 4 to 5, wherein: higher weights are assigned to positioning measurements of the one or more positioning measurements that are more consistent with the error distribution, and lower weights are assigned to positioning measurements of the one or more positioning measurements that are less consistent with the error distribution.

Clause 7. The method of any of clauses 4 to 6, wherein the location estimate of the UE is determined based on positioning measurements of the one or more positioning measurements having a weight above a threshold.

Clause 8. The method of any of clauses 1 to 7, wherein the location estimate of the UE within the environment is based on a two-dimensional or three-dimensional point cloud representing a plurality of estimated positions of the UE within the environment.

Clause 9. The method of clause 8, further comprising: pruning points from the point cloud that are based on positioning measurements of the one or more positioning measurements that are inconsistent with error distributions of the set of error distributions associated with the points.

Clause 10. The method of any of clauses 1 to 9, wherein the set of error distributions is obtained based on: a survey of the environment, a map of the environment, crowd-sourced positioning measurements of the environment, or any combination thereof.

Clause 11. The method of any of clauses 1 to 10, wherein the one or more positioning measurements comprise: one or more timing measurements, one or more angle-based measurements, one or more signal strength measurements, or any combination thereof.

Clause 12. The method of any of clauses 1 to 11, wherein the one or more positioning measurements comprise measurements of one or more reference signals transmitted by one or more access points within the environment.

Clause 13. The method of any of clauses 1 to 12, wherein the positioning entity comprises: a location server, an over-the-top (OTT) server, or a positioning engine executing on the UE.

Clause 14. The method of any of clauses 1 to 13, wherein the environment is an indoor environment.

Clause 15. A positioning entity, comprising: one or more memories; one or more transceivers; and one or more processors communicatively coupled to the one or more memories and the one or more transceivers, the one or more processors, either alone or in combination, configured to: obtain a set of error distributions associated with a set of locations associated with an environment, wherein each error distribution of the set of error distributions indicates an expected error distribution of positioning measurements associated with a corresponding location of the set of locations; obtain one or more positioning measurements obtained by a user equipment (UE) located within the environment; and determine a location estimate of the UE within the environment based on a comparison of uncertainty values associated with the one or more positioning measurements to the set of error distributions.

Clause 16. The positioning entity of clause 15, wherein the one or more processors are further configured to: discard positioning measurements of the one or more positioning measurements that are inconsistent with an error distribution of the set of error distributions associated with the location estimate of the UE.

Clause 17. The positioning entity of clause 16, wherein the positioning measurements of the one or more positioning measurements being inconsistent with the error distribution of the set of error distributions comprises the positioning measurements of the one or more positioning measurements being less likely than a threshold to have been obtained at the location estimate of the UE based on a comparison of uncertainty values associated with the positioning measurements to the error distribution.

Clause 18. The positioning entity of any of clauses 15 to 17, wherein the one or more processors configured to determine the location estimate of the UE comprises the one or more processors, either alone or in combination, configured to: weight the one or more positioning measurements based on a comparison of the one or more positioning measurements to an error distribution of the set of error distributions.

Clause 19. The positioning entity of clause 18, wherein the error distribution of the set of error distributions is selected based on: a coarse location estimate of the UE, a previous location estimate of the UE, a trajectory of the UE, or any combination thereof.

Clause 20. The positioning entity of any of clauses 18 to 19, wherein: higher weights are assigned to positioning measurements of the one or more positioning measurements that are more consistent with the error distribution, and lower weights are assigned to positioning measurements of the one or more positioning measurements that are less consistent with the error distribution.

Clause 21. The positioning entity of any of clauses 18 to 20, wherein the location estimate of the UE is determined based on positioning measurements of the one or more positioning measurements having a weight above a threshold.

Clause 22. The positioning entity of any of clauses 15 to 21, wherein the location estimate of the UE within the environment is based on a two-dimensional or three-dimensional point cloud representing a plurality of estimated positions of the UE within the environment.

Clause 23. The positioning entity of clause 22, wherein the one or more processors are further configured to: prune points from the point cloud that are based on positioning measurements of the one or more positioning measurements that are inconsistent with error distributions of the set of error distributions associated with the points.

Clause 24. The positioning entity of any of clauses 15 to 23, wherein the set of error distributions is obtained based on: a survey of the environment, a map of the environment, crowdsourced positioning measurements of the environment, or any combination thereof.

Clause 25. The positioning entity of any of clauses 15 to 24, wherein the one or more positioning measurements comprise: one or more timing measurements, one or more angle-based measurements, one or more signal strength measurements, or any combination thereof.

Clause 26. The positioning entity of any of clauses 15 to 25, wherein the one or more positioning measurements comprise measurements of one or more reference signals transmitted by one or more access points within the environment.

Clause 27. The positioning entity of any of clauses 15 to 26, wherein the positioning entity comprises: a location server, an over-the-top (OTT) server, or a positioning engine executing on the UE.

Clause 28. The positioning entity of any of clauses 15 to 27, wherein the environment is an indoor environment.

Clause 29. A positioning entity, comprising: means for obtaining a set of error distributions associated with a set of locations associated with an environment, wherein each error distribution of the set of error distributions indicates an expected error distribution of positioning measurements associated with a corresponding location of the set of locations; means for obtaining one or more positioning measurements obtained by a user equipment (UE) located within the environment; and means for determining a location estimate of the UE within the environment based on a comparison of uncertainty values associated with the one or more positioning measurements to the set of error distributions.

Clause 30. The positioning entity of clause 29, further comprising: means for discarding positioning measurements of the one or more positioning measurements that are inconsistent with an error distribution of the set of error distributions associated with the location estimate of the UE.

Clause 31. The positioning entity of clause 30, wherein the positioning measurements of the one or more positioning measurements being inconsistent with the error distribution of the set of error distributions comprises the positioning measurements of the one or more positioning measurements being less likely than a threshold to have been obtained at the location estimate of the UE based on a comparison of uncertainty values associated with the positioning measurements to the error distribution.

Clause 32. The positioning entity of any of clauses 29 to 31, wherein the means for determining the location estimate of the UE comprises: means for weighting the one or more positioning measurements based on a comparison of the one or more positioning measurements to an error distribution of the set of error distributions.

Clause 33. The positioning entity of clause 32, wherein the error distribution of the set of error distributions is selected based on: a coarse location estimate of the UE, a previous location estimate of the UE, a trajectory of the UE, or any combination thereof.

Clause 34. The positioning entity of any of clauses 32 to 33, wherein: higher weights are assigned to positioning measurements of the one or more positioning measurements that are more consistent with the error distribution, and lower weights are assigned to positioning measurements of the one or more positioning measurements that are less consistent with the error distribution.

Clause 35. The positioning entity of any of clauses 32 to 34, wherein the location estimate of the UE is determined based on positioning measurements of the one or more positioning measurements having a weight above a threshold.

Clause 36. The positioning entity of any of clauses 29 to 35, wherein the location estimate of the UE within the environment is based on a two-dimensional or three-dimensional point cloud representing a plurality of estimated positions of the UE within the environment.

Clause 37. The positioning entity of clause 36, further comprising: means for pruning points from the point cloud that are based on positioning measurements of the one or more positioning measurements that are inconsistent with error distributions of the set of error distributions associated with the points.

Clause 38. The positioning entity of any of clauses 29 to 37, wherein the set of error distributions is obtained based on: a survey of the environment, a map of the environment, crowdsourced positioning measurements of the environment, or any combination thereof.

Clause 39. The positioning entity of any of clauses 29 to 38, wherein the one or more positioning measurements comprise: one or more timing measurements, one or more angle-based measurements, one or more signal strength measurements, or any combination thereof.

Clause 40. The positioning entity of any of clauses 29 to 39, wherein the one or more positioning measurements comprise measurements of one or more reference signals transmitted by one or more access points within the environment.

Clause 41. The positioning entity of any of clauses 29 to 40, wherein the positioning entity comprises: a location server, an over-the-top (OTT) server, or a positioning engine executing on the UE.

Clause 42. The positioning entity of any of clauses 29 to 41, wherein the environment is an indoor environment.

Clause 43. A non-transitory computer-readable medium storing computer-executable instructions that, when executed by a positioning entity, cause the positioning entity to: obtain a set of error distributions associated with a set of locations associated with an environment, wherein each error distribution of the set of error distributions indicates an expected error distribution of positioning measurements associated with a corresponding location of the set of locations; obtain one or more positioning measurements obtained by a user equipment (UE) located within the environment; and determine a location estimate of the UE within the environment based on a comparison of uncertainty values associated with the one or more positioning measurements to the set of error distributions.

Clause 44. The non-transitory computer-readable medium of clause 43, further comprising computer-executable instructions that, when executed by the positioning entity, cause the positioning entity to: discard positioning measurements of the one or more positioning measurements that are inconsistent with an error distribution of the set of error distributions associated with the location estimate of the UE.

Clause 45. The non-transitory computer-readable medium of clause 44, wherein the positioning measurements of the one or more positioning measurements being inconsistent with the error distribution of the set of error distributions comprises the positioning measurements of the one or more positioning measurements being less likely than a threshold to have been obtained at the location estimate of the UE based on a comparison of uncertainty values associated with the positioning measurements to the error distribution.

Clause 46. The non-transitory computer-readable medium of any of clauses 43 to 45, wherein the computer-executable instructions that, when executed by the positioning entity, cause the positioning entity to determine the location estimate of the UE comprise computer-executable instructions that, when executed by the positioning entity, cause the positioning entity to: weight the one or more positioning measurements based on a comparison of the one or more positioning measurements to an error distribution of the set of error distributions.

Clause 47. The non-transitory computer-readable medium of clause 46, wherein the error distribution of the set of error distributions is selected based on: a coarse location estimate of the UE, a previous location estimate of the UE, a trajectory of the UE, or any combination thereof.

Clause 48. The non-transitory computer-readable medium of any of clauses 46 to 47, wherein: higher weights are assigned to positioning measurements of the one or more positioning measurements that are more consistent with the error distribution, and lower weights are assigned to positioning measurements of the one or more positioning measurements that are less consistent with the error distribution.

Clause 49. The non-transitory computer-readable medium of any of clauses 46 to 48, wherein the location estimate of the UE is determined based on positioning measurements of the one or more positioning measurements having a weight above a threshold.

Clause 50. The non-transitory computer-readable medium of any of clauses 43 to 49, wherein the location estimate of the UE within the environment is based on a two-dimensional or three-dimensional point cloud representing a plurality of estimated positions of the UE within the environment.

Clause 51. The non-transitory computer-readable medium of clause 50, further comprising computer-executable instructions that, when executed by the positioning entity, cause the positioning entity to: prune points from the point cloud that are based on positioning measurements of the one or more positioning measurements that are inconsistent with error distributions of the set of error distributions associated with the points.

Clause 52. The non-transitory computer-readable medium of any of clauses 43 to 51, wherein the set of error distributions is obtained based on: a survey of the environment, a map of the environment, crowdsourced positioning measurements of the environment, or any combination thereof.

Clause 53. The non-transitory computer-readable medium of any of clauses 43 to 52, wherein the one or more positioning measurements comprise: one or more timing measurements, one or more angle-based measurements, one or more signal strength measurements, or any combination thereof.

Clause 54. The non-transitory computer-readable medium of any of clauses 43 to 53, wherein the one or more positioning measurements comprise measurements of one or more reference signals transmitted by one or more access points within the environment.

Clause 55. The non-transitory computer-readable medium of any of clauses 43 to 54, wherein the positioning entity comprises: a location server, an over-the-top (OTT) server, or a positioning engine executing on the UE.

Clause 56. The non-transitory computer-readable medium of any of clauses 43 to 55, wherein the environment is an indoor environment.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers.

Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of positioning performed by a positioning entity, comprising:
   obtaining a set of error distributions associated with a set of locations associated with an environment, wherein each error distribution of the set of error distributions indicates an expected error distribution of positioning measurements associated with a corresponding location of the set of locations;
   obtaining one or more positioning measurements obtained by a user equipment (UE) located within the environment; and
   determining a location estimate of the UE within the environment based on a comparison of uncertainty values associated with the one or more positioning measurements to the set of error distributions.

2. The method of claim 1, further comprising:
   discarding positioning measurements of the one or more positioning measurements that are inconsistent with an error distribution of the set of error distributions associated with the location estimate of the UE.

3. The method of claim 2, wherein the positioning measurements of the one or more positioning measurements being inconsistent with the error distribution of the set of error distributions comprises the positioning measurements of the one or more positioning measurements being less likely than a threshold to have been obtained at the location estimate of the UE based on a comparison of uncertainty values associated with the positioning measurements to the error distribution.

4. The method of claim 1, wherein determining the location estimate of the UE comprises:
   weighting the one or more positioning measurements based on a comparison of the one or more positioning measurements to an error distribution of the set of error distributions.

5. The method of claim 4, wherein the error distribution of the set of error distributions is selected based on:
   a coarse location estimate of the UE,
   a previous location estimate of the UE,
   a trajectory of the UE, or
   any combination thereof.

6. The method of claim 4, wherein:
   higher weights are assigned to positioning measurements of the one or more positioning measurements that are more consistent with the error distribution, and
   lower weights are assigned to positioning measurements of the one or more positioning measurements that are less consistent with the error distribution.

7. The method of claim 4, wherein the location estimate of the UE is determined based on positioning measurements of the one or more positioning measurements having a weight above a threshold.

8. The method of claim 1, wherein the location estimate of the UE within the environment is based on a two-dimensional or three-dimensional point cloud representing a plurality of estimated positions of the UE within the environment.

9. The method of claim 8, further comprising:

pruning points from the point cloud that are based on positioning measurements of the one or more positioning measurements that are inconsistent with error distributions of the set of error distributions associated with the points.

10. The method of claim 1, wherein the set of error distributions is obtained based on:

a survey of the environment, a map of the environment, crowdsourced positioning measurements of the environment, or any combination thereof.

11. The method of claim 1, wherein the one or more positioning measurements comprise:

one or more timing measurements, one or more angle-based measurements, one or more signal strength measurements, or any combination thereof.

12. The method of claim 1, wherein the one or more positioning measurements comprise measurements of one or more reference signals transmitted by one or more access points within the environment.

13. The method of claim 1, wherein the positioning entity comprises:

a location server, an over-the-top (OTT) server, or a positioning engine executing on the UE.

14. The method of claim 1, wherein the environment is an indoor environment.

15. A positioning entity, comprising:

one or more memories;

one or more transceivers; and one or more processors communicatively coupled to the one or more memories and the one or more transceivers, the one or more processors, either alone or in combination, configured to:

obtain a set of error distributions associated with a set of locations associated with an environment, wherein each error distribution of the set of error distributions indicates an expected error distribution of positioning measurements associated with a corresponding location of the set of locations;

obtain one or more positioning measurements obtained by a user equipment (UE) located within the environment; and determine a location estimate of the UE within the environment based on a comparison of uncertainty values associated with the one or more positioning measurements to the set of error distributions.

16. The positioning entity of claim 15, wherein the one or more processors are further configured to:

discard positioning measurements of the one or more positioning measurements that are inconsistent with an error distribution of the set of error distributions associated with the location estimate of the UE.

17. The positioning entity of claim 16, wherein positioning measurements of the one or more positioning measurements being inconsistent with the error distribution of the set of error distributions comprises the positioning measurements of the one or more positioning measurements being less likely than a threshold to have been obtained at the location estimate of the UE based on a comparison of uncertainty values associated with the positioning measurements to the error distribution.

18. The positioning entity of claim 15, wherein the one or more processors configured to determine the location estimate of the UE comprises the one or more processors, either alone or in combination, configured to:

weight the one or more positioning measurements based on a comparison of the one or more positioning measurements to an error distribution of the set of error distributions.

19. The positioning entity of claim 18, wherein the error distribution of the set of error distributions is selected based on:

a coarse location estimate of the UE, a previous location estimate of the UE, a trajectory of the UE, or any combination thereof.

20. The positioning entity of claim 18, wherein:

higher weights are assigned to positioning measurements of the one or more positioning measurements that are more consistent with the error distribution, and lower weights are assigned to positioning measurements of the one or more positioning measurements that are less consistent with the error distribution.

21. The positioning entity of claim 18, wherein the location estimate of the UE is determined based on positioning measurements of the one or more positioning measurements having a weight above a threshold.

22. The positioning entity of claim 15, wherein the location estimate of the UE within the environment is based on a two-dimensional or three-dimensional point cloud representing a plurality of estimated positions of the UE within the environment.

23. The positioning entity of claim 22, wherein the one or more processors are further configured to:

prune points from the point cloud that are based on positioning measurements of the one or more positioning measurements that are inconsistent with error distributions of the set of error distributions associated with the points.

24. The positioning entity of claim 15, wherein the set of error distributions is obtained based on:

a survey of the environment, a map of the environment, crowdsourced positioning measurements of the environment, or any combination thereof.

25. The positioning entity of claim 15, wherein the one or more positioning measurements comprise:

one or more timing measurements, one or more angle-based measurements, one or more signal strength measurements, or any combination thereof.

26. The positioning entity of claim 15, wherein the one or more positioning measurements comprise measurements of one or more reference signals transmitted by one or more access points within the environment.

27. The positioning entity of claim 15, wherein the positioning entity comprises:

a location server, an over-the-top (OTT) server, or a positioning engine executing on the UE.

28. The positioning entity of claim 15, wherein the environment is an indoor environment.

29. A positioning entity, comprising:

means for obtaining a set of error distributions associated with a set of locations associated with an environment, wherein each error distribution of the set of error distributions indicates an expected error distribution of positioning measurements associated with a corresponding location of the set of locations;

means for obtaining one or more positioning measurements obtained by a user equipment (UE) located within the environment; and means for determining a location estimate of the UE within the environment based on a comparison of uncertainty values associated with the one or more positioning measurements to the set of error distributions.

30. A non-transitory computer-readable medium storing computer-executable instructions that, when executed by a positioning entity, cause the positioning entity to:

obtain a set of error distributions associated with a set of locations associated with an environment, wherein each error distribution of the set of error distributions indicates an expected error distribution of positioning measurements associated with a corresponding location of the set of locations;

obtain one or more positioning measurements obtained by a user equipment (UE) located within the environment; and determine a location estimate of the UE within the environment based on a comparison of uncertainty values associated with the one or more positioning measurements to the set of error distributions.

* * * * *